(12) United States Patent
Hecht et al.

(10) Patent No.: US 7,852,223 B2
(45) Date of Patent: *Dec. 14, 2010

(54) SEQUENCED ANTENNA ARRAY FOR DETERMINING WHERE GAMING CHIPS WITH EMBEDDED RFID TAGS ARE LOCATED ON A BLACKJACK, POKER OR OTHER GAMING TABLE AND FOR MYRIAD OTHER RFID APPLICATIONS

(75) Inventors: Kurt Hecht, Buckingham, PA (US); Leonard Storch, New York, NY (US)

(73) Assignee: CIAS, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,471

(22) Filed: Apr. 28, 2009

(65) Prior Publication Data

US 2009/0267742 A1    Oct. 29, 2009

Related U.S. Application Data

(63) Continuation of application No. 11/463,751, filed on Aug. 10, 2006, now Pat. No. 7,561,053.

(60) Provisional application No. 60/707,375, filed on Aug. 10, 2005.

(51) Int. Cl.
    *G08B 13/14* (2006.01)
(52) U.S. Cl. ............. 340/572.7; 340/572.1; 340/572.8; 463/25; 463/47; 463/1; 273/237; 273/238
(58) Field of Classification Search ............. 340/572.7, 340/572.1, 572.8; 463/25, 47, 1; 273/237, 273/238; 343/788
See application file for complete search history.

(56) References Cited

U.S. PATENT DOCUMENTS

| 3,766,452 A | 10/1973 | Burpee et al. |
| 3,926,291 A | 12/1975 | Burpee et al. |
| 3,983,646 A | 10/1976 | Howard |
| 4,026,309 A | 5/1977 | Howard |
| 4,531,187 A | 7/1985 | Uhland |

(Continued)

OTHER PUBLICATIONS

Rob Scher, RFID Shelf Antennas (2004), Dynasys Technologies, Inc., Clearwater, FL.

(Continued)

*Primary Examiner*—George A Bugg
*Assistant Examiner*—Hongmin Fan
(74) *Attorney, Agent, or Firm*—Frank J. DeRosa; Frommer Lawrence & Haug LLP

(57) ABSTRACT

An improved antenna system, method and apparatus for interrogating and locating RFID (Radio Frequency Identification) tags and other RF (Radio Frequency) devices, and various applications therefore and thereof, are disclosed. One embodiment is for reading and locating the physical position of RFID tags (such as is made by Phillips, Siemens's Infineon and Texas Instrument) that may be embedded in gaming chips (RFID gaming chips, such as is made by Gaming Partners International Corp.) used in a casino, TV or movie studio or elsewhere for wagering at table games and other gambling games including Blackjack, Poker, Craps, Baccarat and Roulette, but the invention may be used for various other RFID applications.

30 Claims, 7 Drawing Sheets

U.S. PATENT DOCUMENTS

| | | | |
|---|---|---|---|
| 4,797,682 A | 1/1989 | Klimczak | |
| 4,814,589 A | 3/1989 | Storch et al. | |
| 4,874,936 A | 10/1989 | Chandler et al. | |
| 4,896,029 A | 1/1990 | Chandler et al. | |
| 5,283,422 A | 2/1994 | Storch | |
| 5,566,245 A | 10/1996 | Zheng et al. | |
| 5,651,548 A | 7/1997 | French et al. | |
| 5,735,742 A | 4/1998 | French | |
| 5,781,647 A | 7/1998 | Fishbine et al. | |
| 5,809,482 A | 9/1998 | Strisower | |
| 6,094,509 A | 7/2000 | Zheng et al. | |
| 6,142,876 A | 11/2000 | Cumbers | |
| 6,234,900 B1 | 5/2001 | Cumbers | |
| 6,267,671 B1 | 7/2001 | Hogan | |
| 6,313,871 B1 | 11/2001 | Schubert | |
| 6,362,737 B1 | 3/2002 | Rodgers et al. | |
| 6,392,544 B1 | 5/2002 | Collins et al. | |
| 6,396,438 B1 | 5/2002 | Seal | |
| 6,509,836 B1 | 1/2003 | Ingram | |
| 6,514,140 B1 | 2/2003 | Storch | |
| 6,517,436 B2 | 2/2003 | Soltys et al. | |
| 6,520,857 B2 | 2/2003 | Soltys et al. | |
| 6,527,271 B2 | 3/2003 | Soltys et al. | |
| 6,530,836 B2 * | 3/2003 | Soltys et al. | 463/29 |
| 6,535,175 B2 | 3/2003 | Brady et al. | |
| 6,579,180 B2 | 6/2003 | Soltys et al. | |
| 6,579,181 B2 | 6/2003 | Soltys et al. | |
| 6,661,335 B1 | 12/2003 | Seal | |
| 6,663,490 B2 | 12/2003 | Soltys et al. | |
| 6,712,696 B2 | 3/2004 | Soltys et al. | |
| 6,750,769 B1 | 6/2004 | Smith | |
| 6,768,419 B2 * | 7/2004 | Garber et al. | 340/572.4 |
| 6,903,656 B1 | 6/2005 | Lee | |
| 2005/0054406 A1 * | 3/2005 | Hazama | 463/9 |
| 2007/0026949 A1 * | 2/2007 | Charlier et al. | 463/47 |
| 2007/0060311 A1 * | 3/2007 | Rowe et al. | 463/25 |

OTHER PUBLICATIONS

Philips Semiconductors, et al., Item-Level Visibility in teh Pharmaceutical Supply Chain: A Comparison of HF and UHF RFID Technologies, White Paper, (2004).

* cited by examiner

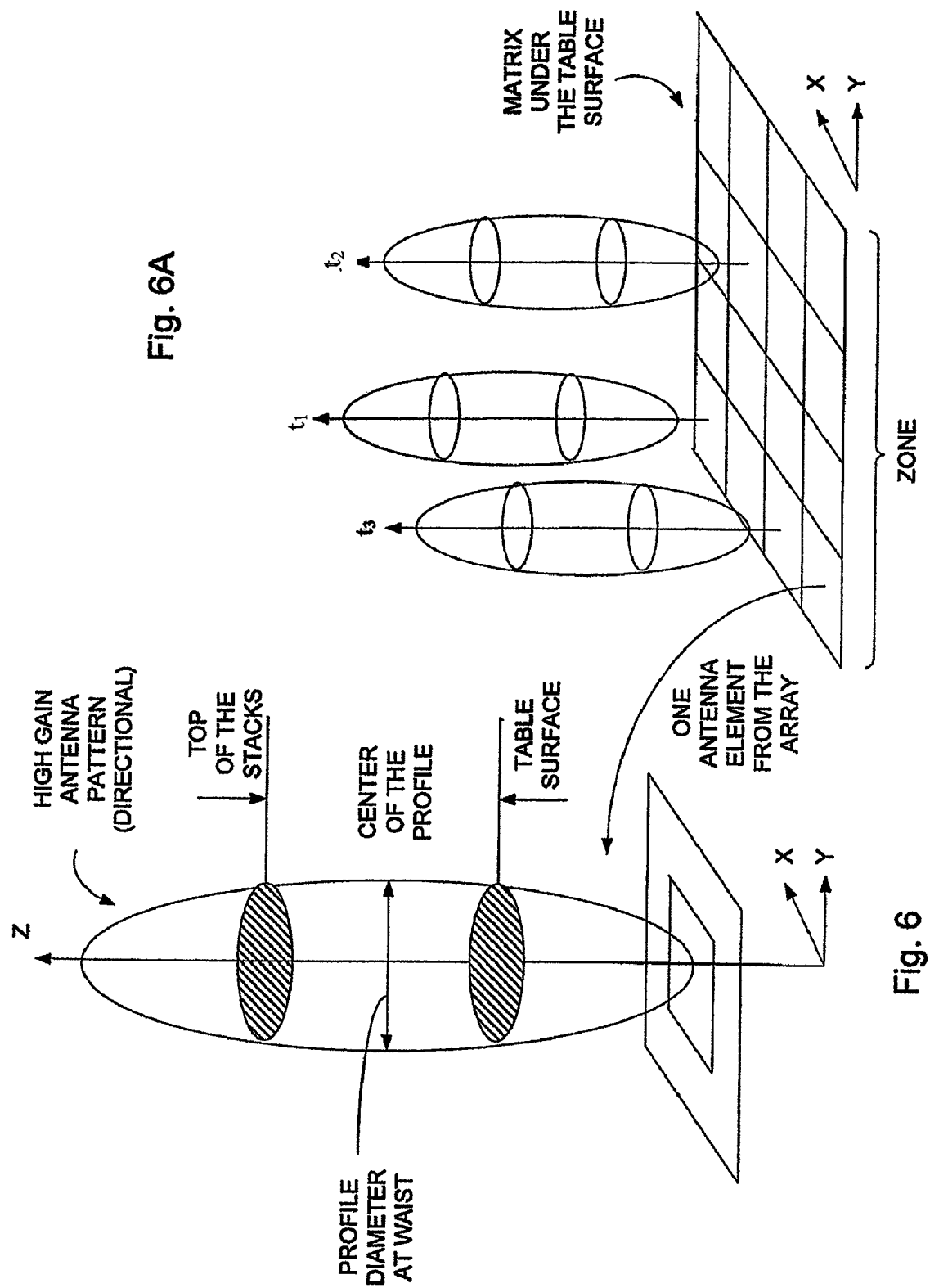

SEQUENCED ANTENNA ARRAY FOR DETERMINING WHERE GAMING CHIPS WITH EMBEDDED RFID TAGS ARE LOCATED ON A BLACKJACK, POKER OR OTHER GAMING TABLE AND FOR MYRIAD OTHER RFID APPLICATIONS

This application is a continuation of application Ser. No. 11/463,751 filed Aug. 10, 2006, now U.S. Pat. No. 7,561,053 which claims the priority of provisional patent application No. 60/707,375 filed Aug. 10, 2005. application Ser. No. 11/463,751 is incorporated herein by reference in its entirety.

BACKGROUND

The following U.S. patents and Other References listed are incorporated in this application by reference:

| U.S. Pat. No. | Inventor | Title |
| --- | --- | --- |
| 6,903,656 | Lee | RFID reader with multiple antenna selection and automated antenna matching |
| 6,750,769 | Smith | Method and apparatus for using RFID tags to determine the position of an object |
| 6,712,696 | Soltys et al. | Method and apparatus for monitoring casinos and gaming |
| 6,663,490 | Soltys et al. | Method and apparatus for monitoring casinos and gaming |
| 6,661,335 | Seal | System and method for locating radio frequency identification tags |
| 6,579,181 | Soltys et al. | Method and apparatus for monitoring casinos and gaming |
| 6,579,180 | Soltys et al. | Method and apparatus for monitoring casinos and gaming |
| 6,535,175 | Brady et al. | Adjustable length antenna system for RF transponders |
| 6,530,836 | Soltys et al. | Method and apparatus for monitoring casinos and gaming |
| 6,527,271 | Soltys et al. | Method and apparatus for monitoring casinos and gaming |
| 6,520,857 | Soltys et al. | Method and apparatus for monitoring casinos and gaming |
| 6,517,436 | Soltys et al. | Method and apparatus for monitoring casinos and |
| 6,514,140 | Storch | System for machine reading and processing information from gaming chips |
| 6,509,836 | Ingram | Smart reflection antenna system and method |
| 6,396,438 | Seal | System and method for locating radio frequency identification tags using three-phase antenna |
| 6,392,544 | Collins et al. | Method and apparatus for selectively activating radio frequency identification tags that are in close proximity |
| 6,362,737 | Rodgers et al. | Object Identification system with adaptive transceivers and methods of operation |
| 6,313,871 | Schubert | Apparatus and method for monitoring gambling chips |
| 6,267,671 | Hogan | Game table player comp rating system and method therefor |
| 6,234,900 | Cumbers | Player tracking and identification system |
| 6,142,876 | Cumbers | Player tracking and identification system |
| 6,094,509 | Zheng, et al. | Method and apparatus for decoding two-dimensional symbols in the spatial domain |
| 5,809,482 | Strisower | System for the tracking and management of transactions in a pit area of a gaming establishment |
| 5,781,647 | Fishbine et al. | Gambling chip recognition system |
| 5,735,742 | French | Gaming table tracking system and method |
| 5,651,548 | French et al. | Gaming chips with electronic circuits scanned by antennas in gaming chip placement areas for tracking the movement of gaming chips within a casino apparatus and method |
| 5,566,245 | Zheng, et al. | The performance of a printer or an imaging system using transform-based quality measures |
| 5,283,422 | Storch et al. | Information transfer and use, particularly with respect to counterfeit detection |
| 4,896,029 | Chandler, et al. | Polygonal information encoding article, process and system |
| 4,874,936 | Chandler, et al. | Hexagonal, information encoding article, process and system |
| 4,814,589 | Storch et al. | Information transfer and use, particularly with respect to objects such as gambling chips |
| 4,797,682 | Klimczak | Deterministic thinned aperture phased antenna array |
| 4,531,187 | Uhland | Game monitoring apparatus |
| 4,026,309 | Howard | Chip structure |
| 3,983,646 | Howard | Chip structure |
| 3,926,291 | Burke et al. | Coded Token and Acceptor |
| 3,766,452 | Burpee et al. | Instrumented Token |

Other references:

"Item-Level Visibility in the Pharmaceutical Supply Chain: A Comparison of HF and UHF RFID Technologies"

A white paper from Philips Semiconductors, TAGSYS and Texas Instruments Inc., Published July 2004

"RFID Shelf Antennas" by Bob Scher, CEO, Dynasys Technologies, Inc.

Copyright© 2004 Dynasys Technologies, Inc., 800 Belleair Rd., Clearwater, Fla.

SUMMARY OF THE INVENTION

According to an embodiment of the invention, a system is provided to identify gaming chips bet on a casino gaming table. The system comprises a plurality of gaming chips each comprising an RFID device which comprises a unique RFID number and a peripheral bar code representing a denomination and a casino gaming table comprising player betting positions for betting one or more of the plurality of chips. The system includes means associated with at least one given position for reading optical bar codes of any chip of the plurality of chips placed in the given position and providing the number thereof. The system also includes means associated with the given position comprising two or more antennas for transmitting interrogation signals in an excitation sequence to respective RFID devices of any chip of the plurality of chips placed in the given position and for receiving a signal sequence from the respective RFID devices in response to the interrogation sequence, and means for processing a received signal sequence to identify respective unique RFID numbers and providing the number thereof and for comparing the number of chips provided by the means for processing and the number provided by the means for reading optical bar codes.

According to some embodiments, the two or more antennas comprises at least one other antenna with different a coverage pattern than the two or more antennas. According to some embodiments, the one other antenna is positioned between the two or more antennas.

According to some embodiments, the means for transmitting interrogation signals in an excitation sequence does not provide for signals from every antenna associated with the at least one given position.

According to some embodiments, the means for processing employs a computer algorithm to determine which antennas are excited and the excitation sequence thereof.

The example that follows describes a casino Blackjack table with playing positions for seven players. Each player has an assigned "betting position" on the table to wager his RFID enabled gaming chips. If a player wins a hand, the dealer places his winnings in his betting position. Various known means may be employed to associate an individual player's identity with one or more betting positions on a Blackjack table before, during or after a player's play session.

BRIEF DESCRIPTION OF THE DRAWINGS

FIG. 4 is a schematic diagram of an array of 39 antennas arranged in an X-Y grid for a gaming table.

FIG. 5 is a schematic diagram of an array of 169 antennas arranged in an X-Y grid for a gaming table.

FIG. 6 is schematic a diagram of a single antenna and its antenna pattern.

FIG. 6A is a schematic diagram of multiple single antennas and antenna patterns for three of the antennas.

DETAILED DESCRIPTION

Figure 1:
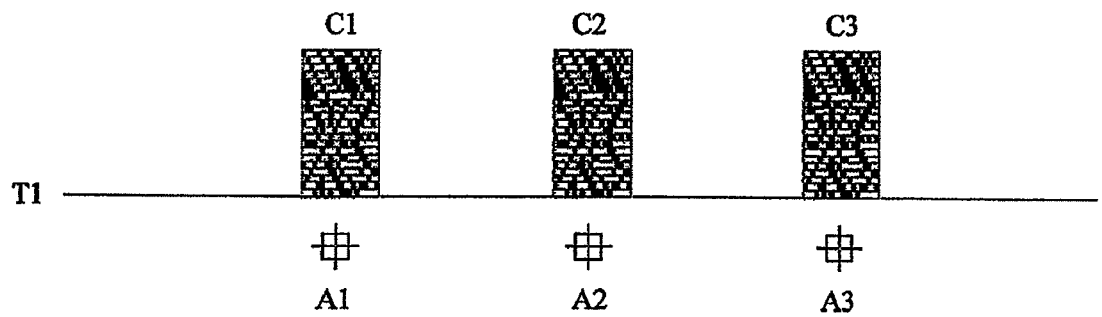
FIGS. 1-3 are side elevation schematic views of stacks of gaming chips in various betting areas on a gaming table.

FIG. 1 shows three stacks of chips, C1, C2 and C3, each stack with 21 chips sitting in adjacent betting areas on a Blackjack table top T1. Below each of the three table top betting areas is an antenna depicted as a "target/sight" in FIG. 1 and labeled A1, A2 and A3. The three stacks are in respective juxtaposed betting areas. Each chip is peripherally bar coded with its denomination value using, for example, coding such as described in U.S. Pat. No. 6,514,140. Each chip also has an embedded RFID tag with information comprising: (at least) a unique RFID number, and various other information. The RFID tag may or may not have read/write capability.

One or more chips with RFID tags sufficiently proximal to antenna A1, for example, may be interrogated by antenna A1 via a transmission from A1, and the tag(s) may transmit a respond to the interrogation with may be received by antenna A1. This is a typical transmit interrogation and response cycle, and it is well known in the art.

In an embodiment of the invention, two adjacent antennas are operated at different times because otherwise one antenna may activate a response from a chip over the other antenna. For example, referring to FIG. 1, if antennas A1 and A2 were activated together, A1 may receive an unwanted response from a chip in the stack of chips C2 above A2 if A2 activates at the same time as A1, and visa versa.

Optically reading the chips bar codes, as described for example in U.S. Pat. No. 6,514,140, can be used in conjunction with reading the RF tags, for reasons including the ability to assist in accurately locating and reading chips. For example, optical readings could identify the number of chips and of what denomination in a particular betting area so that the RF reading can be compared to the optical reading results. If discrepancies were to exist between the optical and RF readings, they could be resolved with further processing.

The following describes one possible example of how optical and RFID reading could work together to provide more accurate, corrected results in the event of, for example, a spurious RFID reading: If the optical system were to see 10 chips of the $25 denomination in a given betting position, but the RF readings included 11 $25 chip responses that appear to be from that betting position, the unique RFID numbers of the 11 chips could be compared to the left and right adjacent betting position RF readings in order to determine which one of the 11 chips' unique RFID numbers was also found in an adjacent position, so that its presence could be automatically removed from the RF reading tally that contained the 11 RF chips' responses. Or, in some cases if chip tracking provisions were being utilized, the tracking history of one of the 11 chips might reveal that it currently belongs to another player at another playing station. Thus, the discrepancy revealed by the combination use of RFID and optical readings could be resolved accurately.

Comparison of optical readings with RFID readings may be helpful or useful to: (i) detect the location of particular chips in order to (ii) help identify faulty or damaged RF or optically coded chips, (iii) detect counterfeit chips, (iv) detect stolen chips, and (v) detect chips being tracked for a variety of management or official (e.g., government) purposes, so that such chips can be to removed, replaced, repaired or deal with it as appropriate or according to a particular casino or other policy.

As has been mentioned in various prior art, casino management would like to bring the player evaluation/tracking abilities long used for slot machines to the gaming table. Using the present invention, casinos can more accurately track table play, without requiring more effort on the part of dealers and other casino personnel, and without changing the way table games are played. Management can give more rewarding "comps" for players that provide more profit to the casino, as well more accurate, lower comps for players that get or have been getting more than they deserve. Improved, more accurate evaluation of players' skill, detection of players who employ suspect strategies, and more accurate accounting of employee efficiency and performance, as well as tighter security for table game operations is also possible.

In a game like Craps, for example, players do not have assigned betting position like on a Blackjack table. In Craps, different positions on the table relate to different bets which are indicated by the markings on the table covering. Different bets have different payout odds associated with them. For example, the "2" (snake eyes) and 12 (box cars) bets located in the "Field" pay double in the event a player placed such a bet and wins.

The RFID antenna array system described herein could be used to glean information about Craps table bets; for example, it could detect when a "2" Field bet is made, and, using known means to read the dice on the next roll, automatically determine if that "2" bet won or lost. If it won, it could then interrogate additional chip(s) placed as payout by the dealer next to this winning "2" chip(s) that had been bet, and (i) provide information as to whether or not the correct amount has been paid, (ii) associate the unique RFID number of the chip(s) in the payout with the unique RFID number of the chip(s) wagered. If the casino system were tracking the RFID numbers of chips in the possession of specific players, the chip(s) won on the "2" bet in this example could be associated with the specific player who made this winning "2" wager.

According to an embodiment of the invention, a system and method are provided using an antenna array for interrogating and locating RFID tags comprising more than one antenna means to transmit a series or set of signals, e.g., in a programmed sequence, the antenna means being able to receive signal responses from sufficiently proximal RFID tags, and associated program means to determine tag location from information derived (i) from responses to specific antennas and/or (ii) from non-responses to other specific antennas. A heuristic program to improve system efficiency may be employed. One embodiment described by way of example involves reading and locating gaming chips.

One purpose of the improved antenna invention described herein is to identify which RFID chips are bet and/or won at each individual (localized) player betting position so that information may be associated with the particular player making the bet. A "position location strategy" will be referred to below in describing how the locations of individual chips are associated with betting positions on the table. (Well known means are used to associate specific betting position(s) with specific players.)

FIGS. 6 and 6A depict an embodiment of an X-Y position detection matrix system. FIG. 6 depicts a single antenna of the type described below. Only one antenna per zone is enabled at a given time ($t_1$, $t_2$, $t_3$, etc.). (The array does not have to be in the slope shown and can be in smaller clusters.) FIG. 6A depicts an antenna array under the table surface comprised of multiple single antennas. What follows is an example of how this purpose may be accomplished: Place a plurality of strategically positioned low power, directional (high gain, such as but not limited to, coil or patch type) antennas in, on, under or associated with a table surface, with each antennas' emitted pattern center axis all projecting parallel to each other and up in the air orthogonal (or reasonably orthogonal, i.e., at an angle that will work with the invention) to the top of a blackjack or other gaming table surface. The use of a high gain antenna provides for a more narrowly focused and subsequently more controlled directional pattern. The use of low power (made possible due to the very short operating/detection distances) provides for minimal reflected energy which could indirectly cause secondary reflections from exciting (chip tag) antennas of non-interest. The antennas would need to be placed below the top playing surface of the table only far enough (the distance could be zero) such that the emitted pattern would be developed (cross-sectionally) enough by the time it reaches the table surface to provide for a fairly cross-sectionally uniform pattern from the table surface to somewhere about 4-5 inches above so as to read a stack of about 20, more or less, gaming chips. The use of a narrower or not fully developed pattern however could provide additional assistance in providing a higher resolution positioning accuracy at the table surface, but may require additional processing in associating tags to stacks because the lower chip(s) in the stacks may not be seen by as many antennas.

The table surface material properties would also need to not vary with time (holding moisture, etc.), and be fairly transparent (loss-less) to the RF energy at the frequencies of interest (in this embodiment, we likely will be projecting and receiving through the table surface and one or more possible table coverings) so as not to distort the patterns or attenuate any transmitted/received energy (or to minimize the distortion of the patterns or attenuation of any transmitted/received energy). It is also possible to make the antenna structure part of the surface of the table. For example, the antenna may be embedded in the table surface or the covering, and a felt or some other gaming table top covering may or may not be used to cover the antenna and the table top. The goal would be to have the emitted patterns as tight around the waist to provide for a higher degree of x-y positioning accuracy, with the z axis being the center of the emitted pattern axis (orthogonal, or reasonably orthogonal, to the table surface). A HF (high frequency) system (for example, 13.56 MHz) may be preferred because these systems tend to work with magnetic fields (near field), rather than electric fields. They may be easier to create in defined areas (like positions on a table), and reading multiple tags may be somewhat easier. Also, water and other similar materials do not present as much of an interference problem. Higher frequency tags (for example, 916 MHz-5.8 GHz) could also be used, but might result in a more challenging and higher cost solution with little if any performance advantage.

In this Blackjack embodiment, the position location strategy would be to enable one antenna at a time within a given zone and de-tune and de-activate (turn-off) all remaining antennas in that zone. The size of the zone would be such that tag detection activities in the frequencies of interest in one zone using the antenna structure of choice would not impact synchronized or unsynchronized activities in another adjacent zone. If the total working area is small you might only have one zone, where as larger areas could provide for multiple (non-interfering) zones. This scalable approach also allows for covering larger position detection areas while minimizing the impact on position detection times due to the parallel operation.

Zone size/area allows for parallel operation on a table surface; zone size provides for simultaneous activation of multiple antennas in a given excitation sequence and provides enough spatial separation so as to prevent interference from a neighboring zone.

Figure 7:
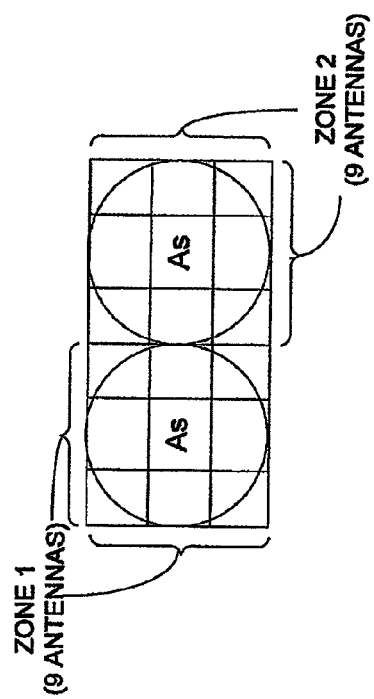
FIGS. 7 and 7A are schematic diagrams of an antenna array of nine antennas in two adjacent antenna zones showing the antenna pattern with the center antenna activated in each zone.
Figure 7A:
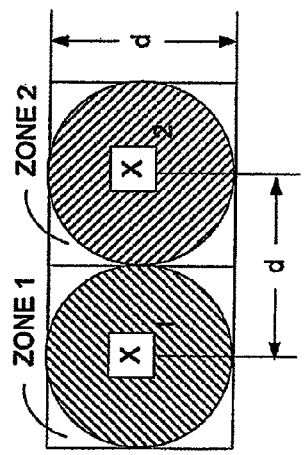

In FIG. 7 two antenna zones, each zone with 9 antennas, are shown; Zone 1 and Zone 2. FIG. 7 shows the definition of zone matrix size based on the worst case cross-sectional emitted antenna element pattern as viewed looking into the table surface (-z axis). With sufficient spatial separation, an antenna operating in one zone would not impact the operation of an antenna operating in a neighboring zone. As shown in FIG. 7A, the worst case emitted pattern diameter or area of influence from an active antenna "d" defines the minimal zone separation or pitch "d" of active antennas operating in adjacent zones.

In FIG. 7A, note that: $X_1$ cannot see $X_2$ at any time. The worst case area of antenna influence of diameter "d" determines zone size.

Figure 8A:
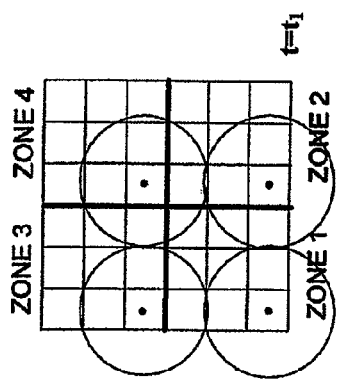
FIG. 8A-8C are schematic diagrams of antenna arrays of 36 antennas in four adjacent antenna zones showing the antenna patterns with different antennas activated.

In FIG. 8A four zones are shown, i.e., zones 1 to 4. Each zone has nine antennas. Each zone forms a quadrant of a square; the whole square as depicted has a total of 36 antennas. The lower left antenna in each of the four zone-quadrants can be excited simultaneously in this embodiment. This is because the effective excitation/coverage area of each antenna, which is depicted by the circle shown around each lower left antenna in each quadrant, does not reach or overlap into any other active-at-the-same-time antenna area. Therefore, these four antennas cannot interfere with each other even if all four are activated simultaneously. This exemplifies how system recognition/throughput efficiency can be improved by simultaneous operation of non-interfering antennas in adjacent structured zones: Instead of requiring enough time for 36 complete antenna activation cycles, only nine such simultaneous cycles would be required to poll all 36 antennas.

Figure 8B:
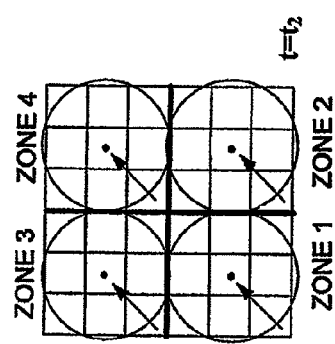

Related FIG. 8B shows activation of four antennas; each antenna at this point in the activation sequence is located in the center of its respective zone. These four centrally located antennas can be activated simultaneously in some sequence (for example) after those in FIG. 8A.

Figure 8C:
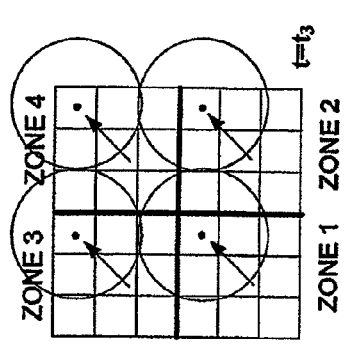

Also related FIG. 8C shows activation of four antennas, possibly next in the activation sequence. These antennas are located in the upper right corner of their respective zone. These four antennas can be activated simultaneously (for example) after those in FIG. 8B.

It should be noted however, that the antenna excitation sequence need not be consecutive, nor even include every antenna. In some embodiments only enough antennas need be excited to provide sufficient results to provide the information being sought. It is possible to employ a heuristic computer algorithm to dynamically determine the excitation sequence to improve system efficiency.

It is important to note that only one antenna per zone may be active at any given time with all non-selected (and non-active) antennas in the array for that zone being de-tuned and de-activated (turned-off) so as to not interfere with the enabled antenna and associated tags within range (i.e., tags that respond to the one enabled antenna in a given zone). An algorithm as described below may be used for determining the sequence (and position) for enabling antennas. Preferably, the algorithm would account for the physical proximity of any excited antennas in adjacent zones to optimize (minimize) zone size.

Figure 9:
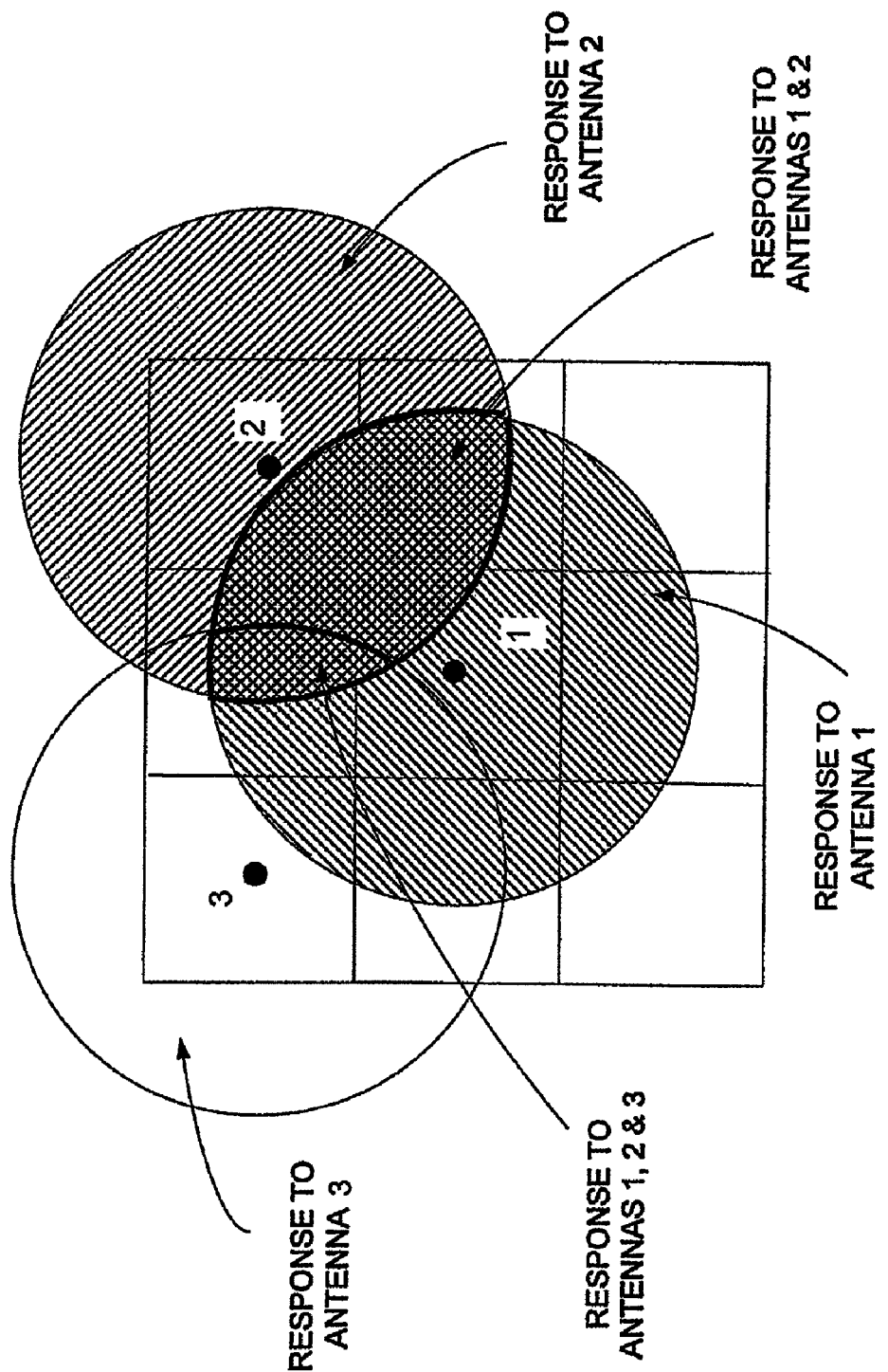
FIG. 9 is a schematic diagram of a 3×3 antenna array of nine antennas showing response patterns for three activated antennas.

FIG. 9 shows a position detection example using overlapping coverages. In FIG. 9, nine antennas arranged 3×3 that make up one zone. The following example will describe how the physical location of one RFID tag positioned within the zone of this example could be determined. This one tag itself in this example is not shown per se, but for the purpose of this example, this one not-shown tag will be referred to as "thatched tag", and the top center antenna will be referred to as the "thatched tag antenna". The thatching being referred to as shown in FIG. 9 is made up of vertical and horizontal lines (similar to lines on grid paper). (Of course, the location of more than one tagged casino chip in a stack of chips above the thatched tag antenna is possible.)

If antennas numbered 1, 2 and 3 in FIG. 9 each in turn had a response from thatched tag, and the un-numbered antenna positioned directly below antenna position number 1 did not get a response from thatched tag, thatched tag must therefore be located above the thatched tag antenna—it could not be above any other antenna location in this example and respond, and not respond, to the antennas as described. I.e., tag location information may be derived from (i) responses to specific antennas and from (ii) non-responses to other specific antennas, as this example demonstrates.

The technique for determining tag position (i.e., the location of tags) on the table surface may also be described as follows: Antenna 1 in a given zone would be enabled (excited), and the group ("group 1") of tags that subsequently respond to that first antenna would automatically be recorded and associated with antenna 1 activation. Adjacent antenna 2 next in the excitation sequence (in the same zone) would be enabled and the subsequent responding group of tags recorded and associated with antenna 2.

Antenna 2's group ("group 2") would be compared by an automatic program against group 1 (those group 1 tags that responded to antenna 1). The result of the comparison of the two groups would reveal which tags were in group 1 but not in group 2, and visa versa. Tags that are new to, or added to, group 2 are closer to the second antenna in a direction moving away from antenna 1, and tags that responded in group 1 but did not respond in group 2 are closer to antenna 1 in a direction moving away from antenna 2. By using this technique of tags adding to adjacent antenna's groups, and tags dropping out relative to inquiries from adjacent antenna's positions, the physical location of tags present on the table surface can be determined.

It is also understood that the antenna arrays only be placed in and around areas where chips would be present on the table surface, thus optimizing the sequence cycle speed required for position detection. For example, a Blackjack game has limited and more controlled chip placement areas on the table surface and would need a less complicated antenna array and excitation sequence than a table game with more positions, or with no specifically-assigned-to-one-player gaming positions, such as Craps. For example, antennas for a Blackjack table may be placed along a line (for example, a straight or a curved line).

Figures 10A, 10B:
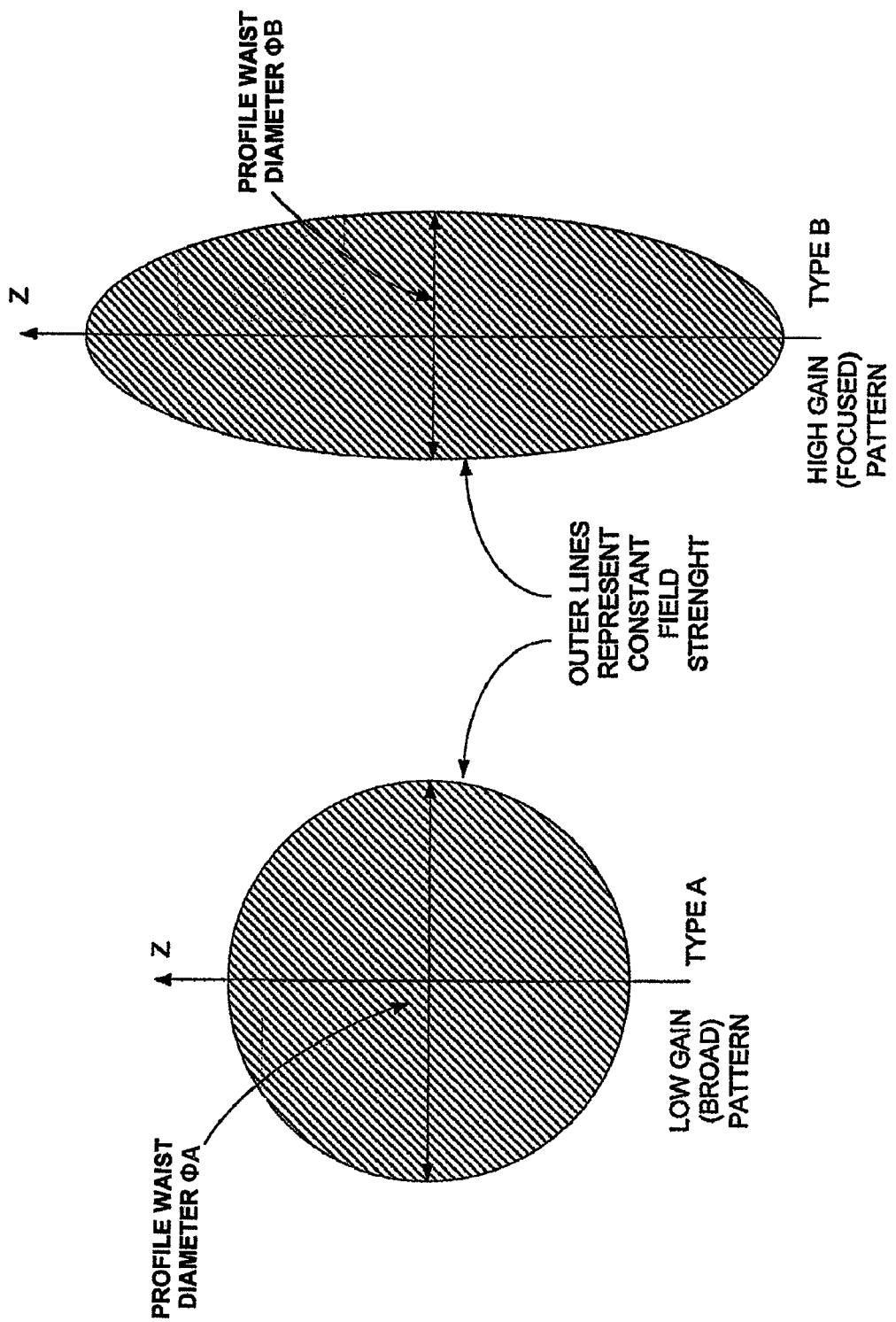
FIGS. 10A and 10B are schematic diagrams showing antenna patterns for different gain antennas.
Figure 10C:
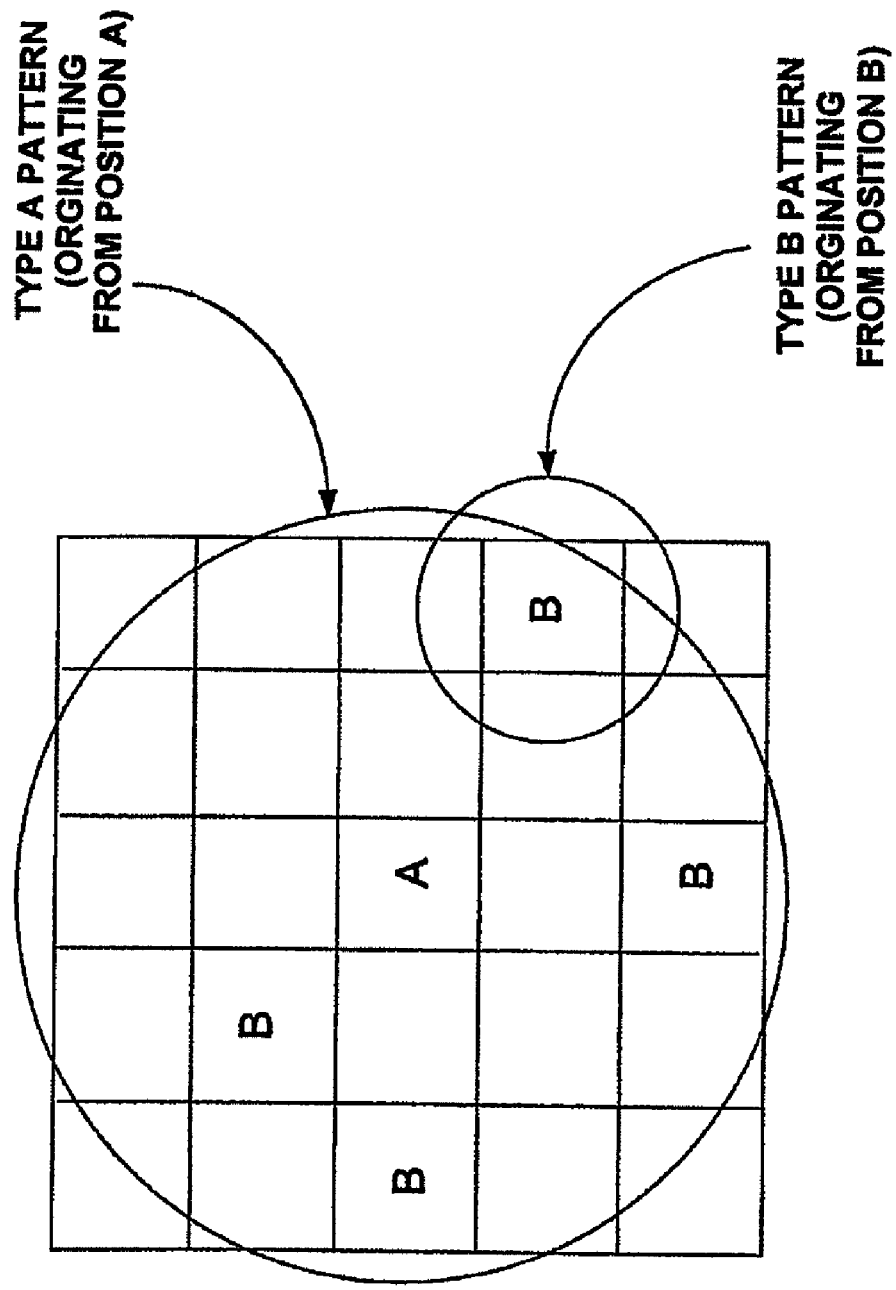
FIG. 10C is a schematic diagram of an array of two different gain antennas and the antenna patterns with two antennas activated.

In another embodiment, it is possible to include different types of directional antenna coverage patterns within the matrix (low gain such as shown in FIG. 10A, and high gain such as shown in FIG. 10B) such that a centrally located/zone centered lower gain (broader pattern, and perhaps higher power emitted patterns) surrounded by higher gain directional (as shown in FIG. 10C) allow for quick determination of the presence of tags in a macro sense within an entire zone such that zone areas not receiving a response to a macro inquiry do not warrant further higher resolution inquiries using the surrounding higher gain antennas. It is also possible to dynamically re-define zone and activation boundaries based on the macro presence response to ultimately speed tag detection/location cycle times.

FIGS. 10A and 10B depict antenna profile cross-sectional focuses comparison (relative). FIG. 10C depicts and alternate zone configuration for macro presence detection and micro position detection. This is an example of a 5×5 zone, in which the center position is type A antenna and the surrounding antenna is of type B. This arrangement enables the center antenna to determine tag presence. If tag(s) detect type B antennas to determine physical position(s) within zone. It is possible to redefine zone and activation boundaries based on macro presence response (dynamic) (to speed detection cycle time).

Figure 2:
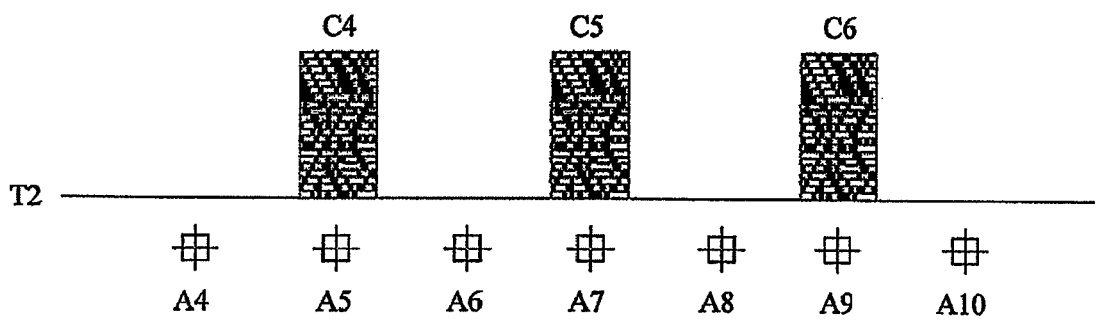

FIG. 2 is similar to FIG. 1 but an additional antenna is shown beneath table top T2 in-between each chip stack's (C4, C5 and C6) betting area: from left to right the antennas shown in FIG. 2 are labeled A4, A5, A6, A7, A8, A9 and A10.

Figure 3:
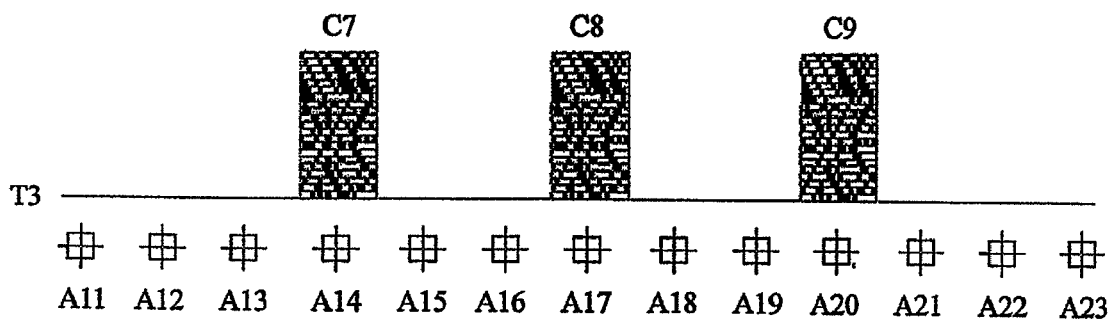

FIG. 3 is similar to FIG. 1 and FIG. 2 but two additional antennas are shown beneath table top T3 in-between each chip stack's (C7, C8 and C9) betting area: from left to right the antennas shown in FIG. 3 are labeled A11, A12, A13, A14, A15, A16, A17, A18, A19, A20, A21, A22 and A23.

FIG. 4 shows 39 antennas arranged in an X-Y grid. Three rows of antennas are shown, Y1, Y2 and Y3, and thirteen columns of antennas are shown in FIG. 4: from left to right the antennas' 13 columns are labeled X1, X2, X3, X4, X5, X6, X7, X8, X9, X10, X11, X12 and X13. The antenna array shown in FIG. 4 could be used on a Blackjack table to provide the depth of three rows of RF readings for the betting positions in order to provide more data so that the betting position location of the RF tagged gaming chips can more accurately be determined.

FIG. 5 shows 169 antennas arranged in an X-Y grid. Thirteen rows of antennas are shown, from bottom to top Y1 to Y13, and thirteen columns of antennas are shown in FIG. 5: from left to right the antennas' 13 columns are labeled X1 to X13. The antenna array shown in FIG. 5 could be used on a Craps table (or a portion of a Craps table) to provide the depth of thirteen rows and thirteen columns of RF readings for the bets placed by any one of several players so that the position location of the RF tagged gaming chips can be determined.

Antennas for a Craps table may, for example, be placed according to x-y grid lines (like the "grid line" arrangement that makes for the 64 boxes on a chessboard, or, not shown, arranged like the elements of UPS's 2D bar codes including Maxicode; see, for example, U.S. Pat. Nos. 6,094,509, 4,896, 029 and 4,874,936, which describes symbols constructed, for example, as a matrix of hexagonal information-encoding elements arranged in a square) and may contain a number of antennas sufficient to accurately determine the location of wagered chips and so that, for example, the correct wager information and information about winning bets can automatically be determined and the amount paid can be correlated to the automatic determination when the chip(s)-in-payment are placed in proximity to a winning bet.

What follows is an operating example of one possible embodiment using a Blackjack table by way of example. However, the principles explained in this exemplar embodiment may be applied by those skilled in the art to utilize more antennas in appropriate arrays as shown, for example, in the Figs.

Antennas may be positioned adjacent to each other at suitable predetermined intervals along a line under a Blackjack table surface. A sequence of their activation and operation in order to determine on which betting positions individual RFID gaming chips are located follows:

If chips "a" to "m" respond when a first antenna is activated, and chips "a" to "d" and "h" to "p" respond when a second antenna is activated, it then can be determined that chips "e," "f," and "g" are closer to the first antenna and in a direction further from the second antenna, and chips "n," "o," and "p" are further from the first antenna and closer to the second antenna. In Table 1, chips responding in turn to the first and second antennas are in bold type and underlined.

TABLE 1

First antenna:
abcdefghijklm n o p q r s t u v w x y z
Second antenna:
abcd e f g hijklmnop q r s t u v w x y z By continuing this example for all antennas in the array's pattern, the relative positions of all responding chips could be determined.

Another way of how to describe how to determine a chips physical position (micro sense vs. actual macro operational mode) using the exclusion algorithm could also be described as follows. To find the position of a single chip, find the edges of that chips' response pattern to other surrounding antenna patterns; basically, at what antenna positions did that chip fail to be recognized?

In other words and as mentioned above, a given tag's location information may be gleaned from (i) what antennas a tag responds to, and from (ii) what antennas a tag does not respond to.

If you then connect the dots of the points on the inside the respective antennas coverage patterns, the chip you are trying to locate will most likely be in the center of this pattern (assuming a matrix of course).

What is claimed is:

1. A system to determine the identity of gaming chips bet in a casino, the system comprising:
   a plurality of gaming chips each comprising an RFID device which comprises unique RFID identification;
   a casino gaming table comprising a plurality of player betting positions for betting one or more of the plurality of chips;
   two or more antennas associated with each of one or more of the plurality of betting positions, the two or more antennas associated with each of the one or more betting positions (a) transmitting interrogation signals in an antenna excitation sequence to the RFID device or devices of the one or more chips of the plurality of chips placed in the associated betting position and (b) receiving response signals from the respective RFID device or devices of the respective chip or chips in the associated betting position; and
   at least one processor coupled to the antennas associated with each of the one or more betting positions, the at least one processor being programmed to
   generate respective excitation sequences,
   receive respective response signals of a respective chip or chips, and
   process the respective response signals and determine the identity of a respective chip or chips which provide response signals.

2. The system of claim 1, wherein the at least one processor is programmed to process the excitation sequences and respective response signals of respective chips to detect the betting position or positions thereof.

3. The system of claim 1, wherein each of the two or more antennas comprises a coverage pattern and include at least one other antenna with different a coverage pattern or patterns than the two or more antennas.

4. The system of claim 3, wherein the at least one other antenna is positioned between the two or more antennas.

5. The system of claim 1, wherein the at least one processor is programmed to generate an excitation sequence in which interrogation signals are not provided to every antenna associated with a betting position.

6. The system of claim 1, wherein at least one of the plurality of gaming chips comprises coding representing a denomination separately from the RFID device.

7. The system of claim 6, wherein the coding comprises an optical bar code associated with a periphery of the at least one chip.

8. The system of claim 7, comprising at least one optical bar code reader associated with at least one betting position positioned to read the optical bar code of each chip bet in the at least one betting position.

9. The system of claim 8, comprising means for providing a number of chips in each of the one or more betting positions.

10. The system of claim 9, wherein the at least one processor is programmed to compare response signals received from a chip or chips in a betting position of the one or more betting positions and the number of chips in that betting position provided by the means for providing.

11. A system to determine information associated with gaming chips bet in a casino, the system comprising:
   a plurality of gaming chips each comprising an RFID device which comprises the information;
   a casino gaming table comprising a plurality of player betting positions for betting one or more of the plurality of chips;
   two or more antennas associated with each of one or more of the plurality of betting positions, the two or more antennas associated with each of the one or more betting positions (a) transmitting interrogation signals in an antenna excitation sequence to the RFID device or devices of the one or more chips of the plurality of chips placed in the associated betting position and (b) receiving response signals from the respective RFID device or devices of the respective chip or chips in the associated betting position; and at least one processor coupled to the antennas associated with each of the one or more betting positions, the at least one processor being programmed to generate respective excitation sequences, receive respective response signals of a respective chip or chips, and process the respective response signals and determine the information of a respective chip or chips which provide response signals.

12. The system of claim 11, wherein the at least one processor is programmed to process the excitation sequences and respective response signals of respective chips to detect the betting position or positions thereof.

13. The system of claim 11, wherein each of the two or more antennas comprises a coverage pattern and include at least one other antenna with different a coverage pattern or patterns than the two or more antennas.

14. The system of claim 12, wherein the at least one other antenna is positioned between the two or more antennas.

15. The system of claim 11, wherein the at least one processor is programmed to generate an excitation sequence in which interrogation signals are not provided to every antenna associated with a betting position.

16. The system of claim 11, wherein at least one of the plurality of gaming chips comprises coding representing a denomination separately from the RFID device.

17. The system of claim 16, wherein the coding comprises an optical bar code associated with a periphery of the at least east one chip.

18. The system of claim 17, comprising at least one optical bar code reader associated with at least one betting position positioned to read the optical bar code of each chip bet in the at least one betting position.

19. The system of claim 18, comprising means for providing a number of chips in each of the one or more betting positions.

20. The system of claim 19, wherein the at least one processor is programmed to compare response signals received from a chip or chips in a betting position of the one or more betting positions and the number of chips in that betting position provided by the means for providing.

21. A system to determine the identity of gaming chips bet in a casino, the system comprising:

a plurality of gaming chips each comprising an RFID device which comprises unique RFID identification;

a casino gaming table comprising a plurality of player betting positions for betting one or more of the plurality of chips;

two or more antennas associated with each of one or more of the plurality of betting positions, the two or more antennas associated with each of the one or more betting positions (a) transmitting interrogation signals in an antenna excitation sequence to the RFID device or devices of the one or more chips of the plurality of chips placed in the associated betting position and (b) receiving response signals from the respective RFID device or devices of the respective chip or chips in the associated betting position; and means coupled to the antennas associated with each of the one or more betting positions for generating respective excitation sequences, receiving respective response signals of a respective chip or chips, and determining the identity of a respective chip or chips which provide response signals.

22. The system of claim 21, wherein the means coupled to the antennas associated with each of the one or more betting positions for generating the excitation signals and receiving respective response signals of a respective chip or chips determines the betting position or positions of a respective chip or chips which provide response signals.

23. The system of claim 21, wherein each of the two or more antennas comprises a coverage pattern and include at least one other antenna with different a coverage pattern or patterns than the two or more antennas.

24. The system of claim 22, wherein the at least one other antenna is positioned between the two or more antennas.

25. The system of claim 21, wherein the means generates an excitation sequence in which interrogation signals are not provided to every antenna associated with a betting position.

26. The system of claim 21, wherein at least one of the plurality of gaming chips comprises coding representing a denomination separately from the RFID device.

27. The system of claim 26, wherein the coding comprises an optical bar code associated with a periphery of the at least one chip.

28. The system of claim 27, comprising at least one optical bar code reader associated with at least one betting position positioned to read the optical bar code of each chip bet in the at least one betting position.

29. The system of claim 28, comprising means for providing a number of chips in each of the one or more betting positions.

30. The system of claim 29, wherein the means coupled to the antennas associated with each of the one or more betting positions compares response signals received from a chip or chips in a betting position of the one or more betting positions and the number of chips in that betting position provided by the means for providing.

* * * * *